United States Patent [19]

Hashimoto

[11] Patent Number: 4,594,664
[45] Date of Patent: Jun. 10, 1986

[54] CASH PROCESSING METHOD AND SYSTEM

[75] Inventor: Koichi Hashimoto, Himeji, Japan

[73] Assignee: Glory Kogyo Kabushiki Kaisha, Hyogo, Japan

[21] Appl. No.: 427,925

[22] Filed: Sep. 29, 1982

[30] Foreign Application Priority Data

Dec. 2, 1981 [JP] Japan .................. 56-194140

[51] Int. Cl.⁴ .......... G07G 1/12; G07G 7/48; G07G 15/20
[52] U.S. Cl. ............ 364/405; 364/404; 364/406; 364/900
[58] Field of Search .......... 364/401, 404, 405, 406, 364/900

[56] References Cited

U.S. PATENT DOCUMENTS

| | | | |
|---|---|---|---|
| 3,909,604 | 9/1975 | Monna | 364/900 X |
| 4,266,271 | 5/1981 | Chamoff et al. | 364/401 |
| 4,319,326 | 3/1982 | Uchida | 364/405 |
| 4,398,250 | 8/1983 | Hosono | 364/404 |
| 4,468,750 | 8/1984 | Chamoff et al. | 364/401 X |

OTHER PUBLICATIONS

Point-of-Sale Terminal System with Clerical Facilities/Functions, Allmendinger et al., IBM Tech. Discl., vol. 18, #8, 1/76.

Primary Examiner—Jerry Smith
Assistant Examiner—Charles B. Meyer
Attorney, Agent, or Firm—Spensley Horn Jubas & Lubitz

[57] ABSTRACT

A cash processing method is disclosed for aggregating sales data from cash processing units. Each cash processing unit has a coin counter and bill counter for accepting coins and bills received from sales, sorting the coins, and counting the coins and bills. Each cash processing unit aggregates sales data by "lot", which is a designation for a grouping of data, where the grouping of data may be according to a particular sales department, having at least one cash register, or according to a particular cash register used for processing sales transactions from at least one sales department. The aggregated sales data is identified by identification codes associated with each lot of data. Each cash processing unit collects sales data and aggregates the sales data, identifying it with a particular code number. This data is then sent to one of the cash processing units that has been designated the master unit.

3 Claims, 4 Drawing Figures

CASH PROCESSING METHOD AND SYSTEM

BACKGROUND OF THE INVENTION

1. Field of the Invention

The present invention relates to a cash processing method for processing many kinds of denominations, and in particular to a method for performing cash processing by effectively using a plurality of cash processing units, in each of which a coin counter and a bill counter are connected to an arithmetic unit.

2. Description of Prior Art

When processing a large amount of proceeds in large retail stores such as super markets and department stores, or when processing proceeds of tellers in banks, etc., the proceeds have typically been processed by individually using a plurality of cash processing units, in each of which a coin sorter/counter and a bill counter are connected to an arithmetic unit. That is, in super markets, department stores, etc. such a cash processing unit has been typically assigned to the cash register of each shop in the store, while in banks, etc. to each teller for the processing of proceeds.

These cash processing units may correspond to each shop department so as to cause a cash processing unit to exclusively process the proceeds of the corresponding department.

3. Problems involved in the Prior Art

When a cash processing unit is brought to correspond to each department for processing proceeds exclusively of the department as in the prior art method described above, there occurs inconvenience and inefficiency that the cash processing units cannot be operated uniformly, though such method is preferable since total proceeds of each department can be obtained. That is, a cash processing unit assigned to a busy shop or department must be operated in a large amount of time for cash processing while a cash processing unit assigned to a shop of a small number of customers is likely to put in idle state. If it is so designed that each cash processing unit processes data from any department all units can be operated uniformly. However, there is a drawback in such design that for obtaining the total proceeds of a particular department, data on the department should be collected from the data processed by all units and reedited. The data thus reedited should be totaled anew by, for example, a manual operation.

The above problems also rise in the processing performed on a teller basis in banks, etc.

SUMMARY OF THE INVENTION

The present invention has been made taking the above-mentioned background situation into account, and therefore an object of the invention is to provide a cash processing method wherein a plurality of cash processing units are operated and still processing efficiency can be improved to a great extent.

According to the present invention, using a plurality of cash processing units each configured by connecting a coin counter and a bill counter to an arithmetic unit, sales data from designated cash registers are totalized randomly regardless of the department to be processed, such as the shop department. The sales data constitutes a "lot", which may comprise data from one or more cash regsiters accepting sales transactions from one or more sales department. The sales data thus processed is identified by the identification code indicating the department to be processed and is properly inputted to the arithmetic unit of a particular cash processing unit. Desired data of the same department to be processed based on the above identification code are further totalized by the arithmetic unit of said particular unit.

More specifically, of all cash processing units a particular unit is designated the master station, and all others are designated slave stations. Configuration is such that arithmetic units of all slave stations are connected to the arithmetic unit of the master station via, say, communication lines for performing semiduplex communication according to the polling/selecting system between the master station and the slave stations. In this manner, a smooth input of the above-mentioned slave station sum data to the master station is realized. Here, the semiduplex communication is a communication that can be made only from any one station, that is, alternating transmission from the master station and an applicable slave station. "Polling" means that the master station makes an inquiry to each slave station periodically to check if the slave station desires to have the master station send data or instructions. "Selecting" means that the master station gives data or instruction (statement) to the applicable slave station. Accordingly, sales data of individual departments to be processed can be known in a short period of time by the method wherein, for example, lot-by-lot sum data indicating the department to be processed is transmitted from each slave station to the arithmetic unit of the master station by periodically polling and selecting each slave station (the code number indicating the department to be processed is added by the operator at the time of data summation of each lot), and the sum data transmitted from each station is summed by the arithmetic unit of the master station for each department to be processed. Of course, sum data to be obtainable from the arithmetic unit of the master station is not limited to sales data of each department to be processed, but various sum data corresponding to the data summation specification at each cash processing unit (typically sum data by the kind of credit when sum data by the kind of currency and various credits are included) and gross total sales data can also be obtained easily.

By the cash processing method according to the present invention, lot-by-lot sales data can be totalized randomly at a plurality of cash processing units. In addition, desired data, such as sum data, of each department to be processed can be picked up from the data totalized at each cash processing unit automatically and totalized. In this manner, a plurality of cash processing units can be operated uniformly, and the cash processing efficiency can be enhanced to a great extent as well.

DESCRIPTION OF THE PREFERRED EMBODIMENT

The cash processing method according to the present invention will now be described in detail in connection with the accompanying drawings in which the preferred embodiment of the invention is illustrated by way of example.

Figure 1:
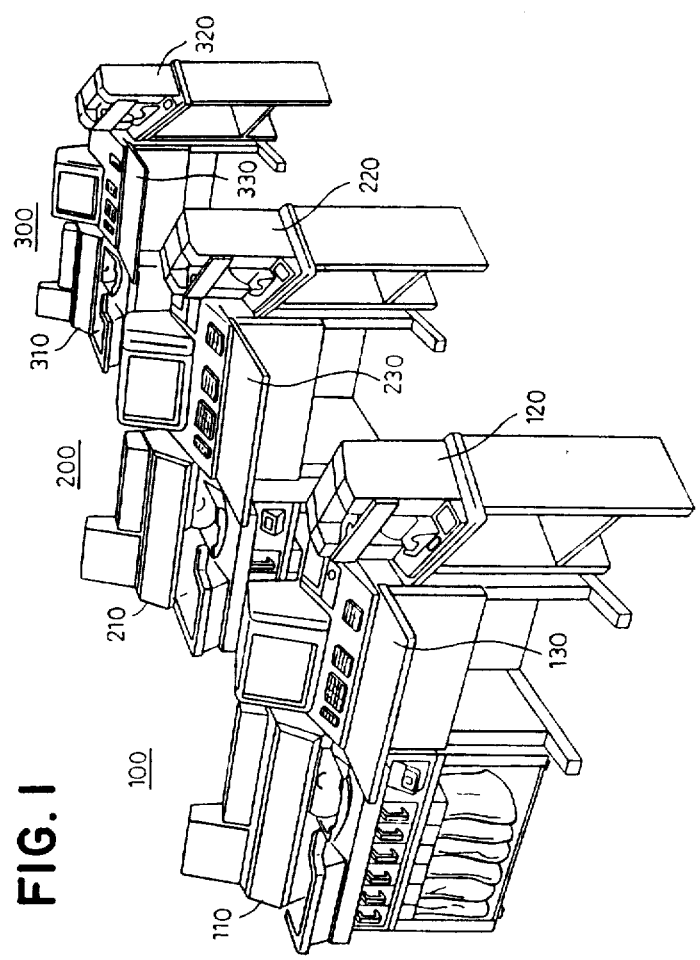
FIG. 1 is an outside view of the cash processing system employing the cash processing method according to the present invention.

FIG. 1 shows the appearance of cash processing blocks which perform the cash processing method according to the present invention. These blocks 100, 200, and 300 comprise coin sorter/counters 110, 210 and 310 for sorting and counting coins, bill counters 120, 220, and 320, and arithmetic units 130, 230, and 330 for totalizing data outputted from the counters respectively.

Though only three cash processing units are shown in FIG. 1 for simplification, in the preferred embodiment of the present invention described below, eight blocks are used for performing the specified cash processing.

Figure 2:
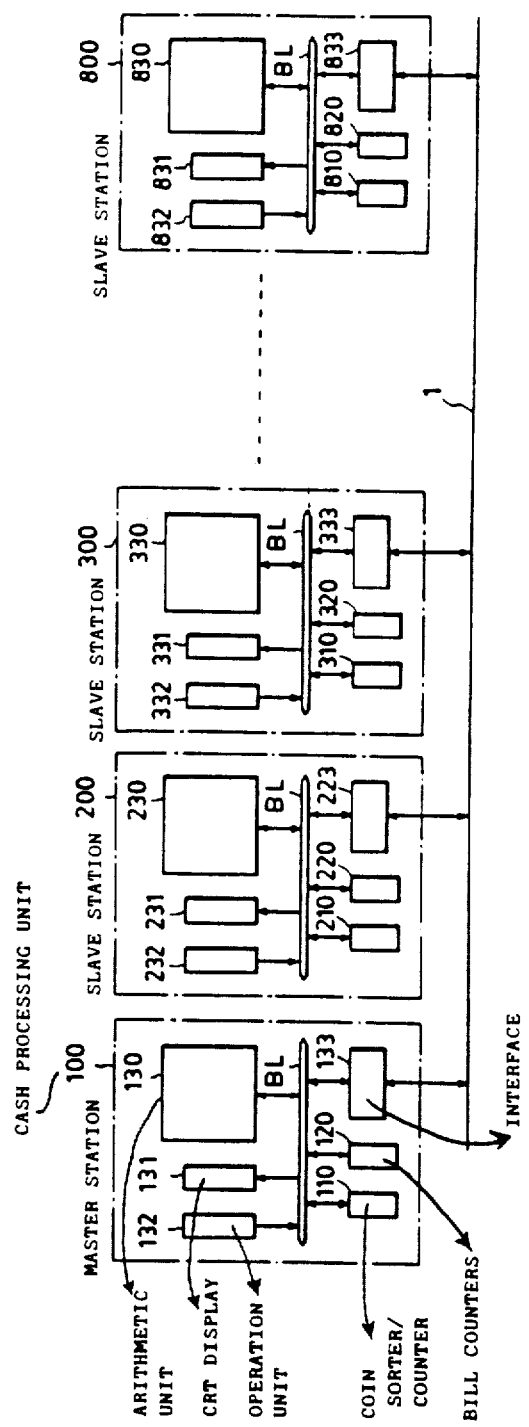
FIG. 2 is a block diagram of said cash processing system.

FIG. 2 is a block diagram of typical system configuration for performing the cash processing method according to the present invention. The cash processing system comprises eight cash processing units in which the first cash processing unit 100 is the master station and other seven units 200 thru 800 are slave stations. Arithmetic units 230, 330, . . . 830 of these slave stations are connected with an arithmetic unit 130 of the master station via a communication line 1 in the online mode.

There are interfaces 133, 233, 333, . . . 833 between said communication line 1 and arithmetic units 130, 230, 330, . . . 830 for the parallel-to-serial data conversion or vice versa at the data delivery between the former and the latter. The interface is connected with the arithmetic unit via bus line BL. In individual units, there are coin sorter/counters 110, 210, 310, . . . 810, bill counters 120, 220, 320, . . . 820, CRT display units 131, 231, 331, . . . 831 for visually displaying sum data and other desired data, and operation units 132, 232, 332, . . . 832 for inputting desired data which visually display sum data, etc. These are also connected with the arithmetic units 130, 230, 330, . . . 830 via the bus line BL.

Figure 3:
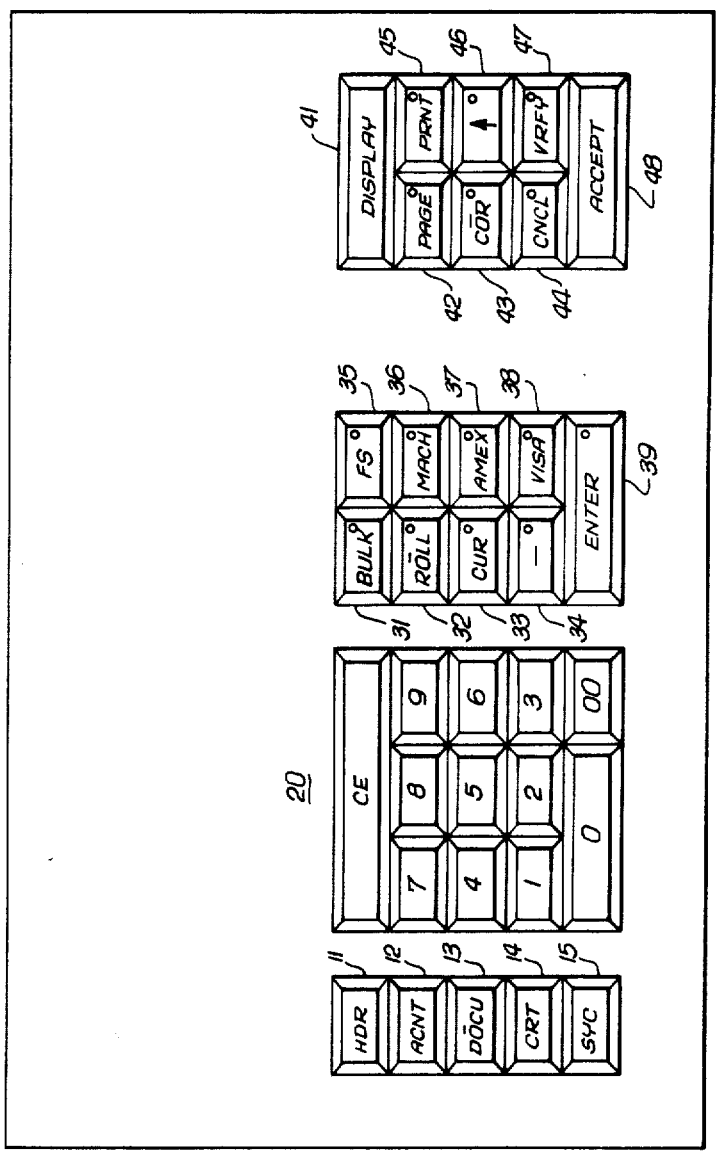
FIG. 3 is a layout diagram of a typical key panel of the operation unit provided in common in cash processing blocks composing said cash processing system.

FIG. 3 shows typical key panel layout of aforementioned operation unit. The function of each key will be briefly described below. HEADER KEY 11: Key for displaying control items to be fed before starting operation including code number of the department to be processed, code number of operators, etc. on the display unit. ACCOUNT KEY 12: Key for displaying the demand for lot number input of proceeds to be processed on the CRT display unit. This key is also used for causing the coin sorter/counter to automatically sort/count coins of proceeds, and the bill counter to automatically count bills of proceeds. For the bill counting by the above bill counter, the CRT display unit demands that the denomination of bills to be counted is specified. This key is further used when inputting the amount of various exchange tickets constituting non-cash income. DOCUMENT KEY 13: Key to be used for the print-out of the contents of various summing operations. As this key is depressed, various summation item names are displayed on the CRT display unit. Accordingly, when the PRINT key 45 is depressed with the cursor of the CRT display unit set in the position of the desired summation item name, the total value of the item will be printed out. CRT KEY 14: Key to be used for displaying the contents of various summing operations on the CRT display unit. As this key is depressed, various summation item names are displayed on the CRT display unit. Accordingly, when a later-mentioned DISPLAY key is depressed with the cursor of the CRT display unit set in the position of a desired item name, the total value of said item will be displayed on the CRT display. SYSTEM CHECK KEY 15: Key to be used for system check. TEN-KEY & CE KEY 20: Key to be used for numerical value input and for correcting input nemerical values. BULK KEY 31: Key to be used with the ten-key for inputting directly bulk coins which are not counted by the counter. ROLL KEY 32: Key for inputting rolled coins (specified number of coins of the same denomination wrapped in a bar-like fashion) via the ten-key. CURRENCY KEY 33: Key for inputting the small amount of bulk paper money which is not counted by the counter. MINUS KEY 34: Key for data correction. NON-CASH KEY 35-38: Keys for inputting food stamps, master charge, American Express, and visa (coupons and credits) via the ten-key. Kinds of keys can be increased as required. ENTER KEY 39: Key for inputting various data fed via the ten-key to the arithmetic unit. DISPLAY KEY 41: Key for displaying desired total value on the CRT display unit. PAGE KEY 42: Key for changing page of display item. CORRECTION KEY 43: Key for data correction. CANCEL KEY 44: Key for data cancellation. PRINT KEY 45: Key for the print-out of desired total value. FEED KEY 46: Key for the printer paper feed. VERIFY KEY 47: Key for verifying input data of checks, etc. ACCEPT KEY 48: Key to be used at the end of processing of each lot. As this key is depressed, whole data of a lot stored in the buffer area of the arithmetic unit are transferred to the data area and retained.

That is, the cash processing system shown in FIG. 2 is designed to operate in such a way that as the operator assigned to the cash processing unit inputs required data for example, the (code number of the cash register which the operator will process, operator's code number, data, etc. when proceeds of the cash registers provided in each shop department of a super market is the object of cash processing) via the operation unit to each arithmetic unit based on the display content of the CRT display unit, each arithmetic unit stores the data in the buffer area. As the operator counts said proceeds by the coin sorter/counter and the bill counter based on the display content of the CRT display unit, each arithmetic unit receives these count data and properly sums up the data thereafter storing the sum data thus obtained to the buffer area corresponding to each data registered/stored as described above. Then, as each operator notifies that the proceeds of one lot (one cash register in the aforementioned example of a super market) has been processed, the operation depresses the accept key and the data stored in the buffer area previously is loaded to the data area, even then allowing the data loaded in the data area to be delivered via the communication line 1.

Both said buffer area and data area have the memory structure corresponding to the sort keys of demoninations, gold notes, etc., and particularly the data area is composed of many units (typically 200 units) capable of accomodating data df many lots, a single unit being the memory area corresponding to a single buffer area.

The cash processing method according to the present invention is designed so that as the operator processes of each lot by the cash processing units 100-800, totalized sales data of each lot is automatically input to the arithmetic unit 130 of the block 100 which is designated the master station, and the arithmetic unit 130 of the master station further performs summing operation based on the data thus fed. The master station, is provided with a memory area in addition to the aforementioned data area, for aggregating by the kind of currency (denomination), aggregating by the kind of gold note, and aggregating the results of the above aggregations. For the delivery of said sum data (sales data of individual lots) between the arithmetic unit 130 of the master station and the arithmetic units 230, 330, . . . 830 of the slave stations is performed by the semiduplex communication according to aforementioned polling-/selecting method as an example.

Figure 4:
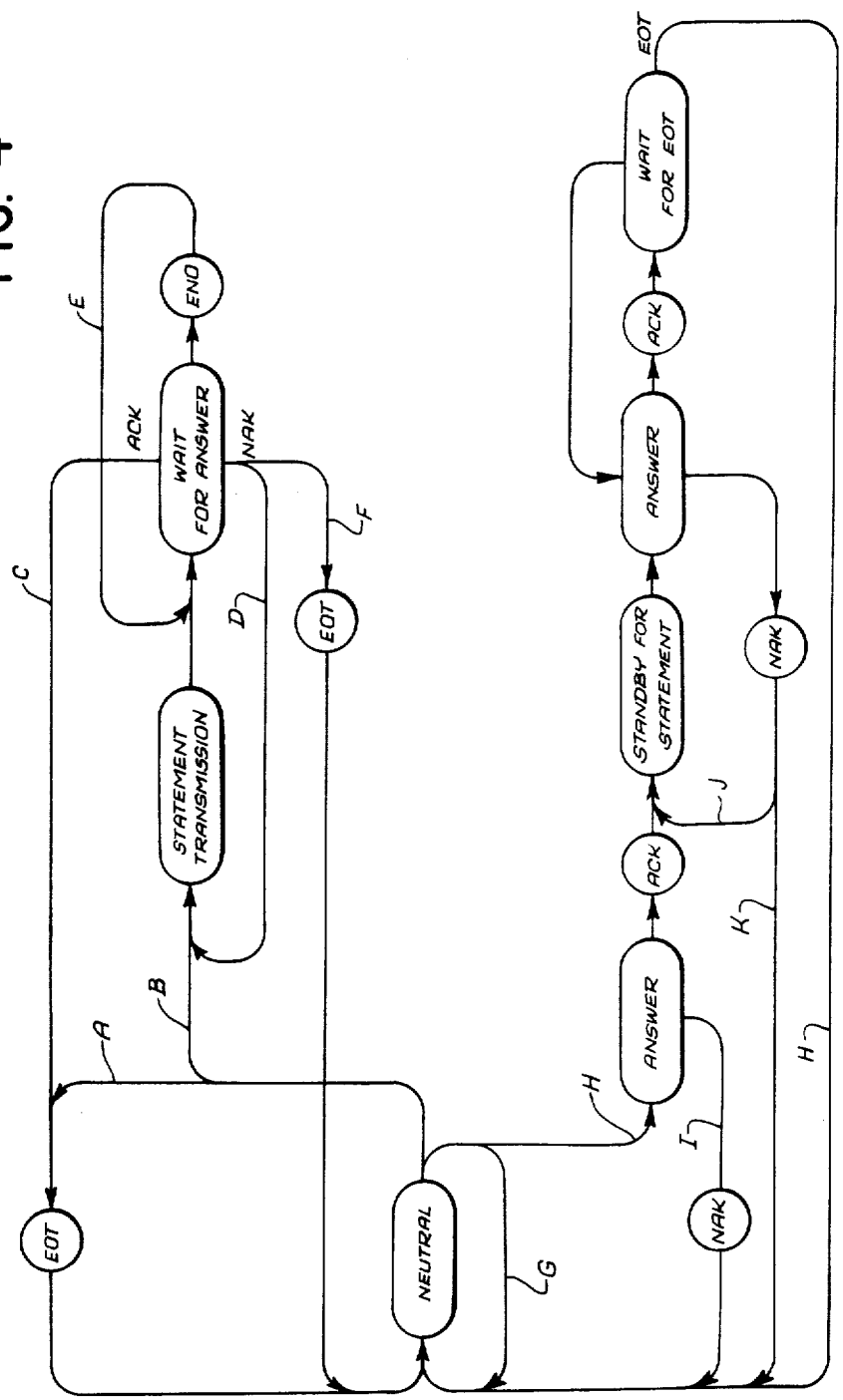
FIG. 4 is a diagram illustrating data transmission status transition relative to data communication method constituting a part of the cash processing method according to the present invention.

FIG. 4 illustrates the transmission status transition relative to polling/selecting, particularly as viewed from the slave station.

In this communication, prior to the polling/selecting, an inquiry is made from the master station to each slave station for demanding line connection. This is hereinafter referred to as ENQ sequence. In this ENQ sequence, the master station sends out the station number of a particular slave station to which the line is to be connected, discrimination between polling and selecting, etc. in a statement of a specified format to the communication line 1 (FIG. 2). That is, the master station executes the ENQ sequence to a plurality of slave stations in parallel with proceeds processing per each lot, demanding line connection for the polling specifying slave stations sequentially. The slave station would not accept this demand when it is in the state of processing lot proceeds. More specifically, the period from the end of the proceeds processing of one lot upon the depression of the ACCEPT key 48 shown in FIG. 3 to the start of proceeds processing of the next lot upon the depression of the HEADER key 11 is defined as the data transmittable time. To the polling from the master station, the slave station transmits whole data of one lot.

First, operations relative to polling will be described. ROUTE A: When the slave station is in the state of processing at the time the slave station received an ENQ statement from the master station in the ENQ sequence, an end signal EOT is sent out to the master station indicating that there is no data to be transmitted. That is, communication is terminated. Route B: When the slave station has completed the processing and has a data to be sent at the time the slave station received ENQ statement from the master station in the ENQ sequence, the slave station sends out said data in a specified format to the master station, and waits for answer from the master station. Route C: When the master station duly received the data sent from the slave station, the former sends out an affirmative answer signal ACK to the latter. Thereupon, the slave station sends an end singnal EOT to the master station, terminating the communication. Route D: Conversely, when the master station failed to receive the data sent from the slave station duly, the former sends a negative answer signal NAK to the latter. Thereupon, the slave station sends a data statement again to the master station, waiting for the answer from the master station. Route E: When no answer is sent from the master station after a lapse of a predetermined time, an answer request signal ENQ is sent to the master station. Route F: The slave station repeatedly sends a data statement each time a negative answer signal is sent from the master station (refer to Route D). When this repetition is made specified number of times, an end signal EOT is sent to the master station, terminating the communication.

Then, operations relative to the selecting will be described. Route G: The master station demands line connection for the selecting to each slave station as the ENQ sequence. Route H: When the slave station recognizes the ENQ statement from the master station, and is in the acceptable state, the slave station sends an affirmative answer signal ACK to the master station. As a result, the master station sends a specified data statement or instruction statement to the slave station. On the other hand, the slave station waits for the statement from the master station, and sends an affirmative answer signal ACK to the master station upon receivihg this statement duly. Thereafter, the slave station waits for the end signal EOT from the master station, and terminates the communication upon the reception of the end signal EOT. Route I: When the slave station is in the unreceivable state (for example, when executing other processing), even though the slave station recognized the ENQ statement from the master station, the slave station sends a negative answer signal NAK to the master station, and returns to neutral, waiting for the next designation. Route J: When the slave station does not receive the data or instruction statement duly even though the slave station which recognized the ENQ statement is in the receivable state and waiting for the data or instruction statement, the slave station sends a negative answer signal NAK to the master station, and waits until the reception of said statement. Accordingly, the master station resends the data or instruction statement to the slave station. Route K: When the operation of Route J is repeated as many times as specified, or when the duration exceeded the specified time, the slave station returns to neutral, waiting for the next designation. As the polling and selecting are performed between the master and slave stations in this manner, the master station can control data of all slave stations, and in addition the master station can cause all slave stations to start initially before the processing operation, further being able to reset data retained by all slave stations at the completion of specified processing.

Accordingly, by providing a memory area for storing sum data of all units including the unit designated the master station in the arithmetic unit of the cash processing unit which is designated the master station, and the function to further perform the specified summation based on the identification code suitably added to said sum data, a variety of desired sum data may be easily obtained.

What is claimed is:

1. In a cash processing system comprising a plurality of cash processing units, each processing unit having;
    a coin sorter/counter for sorting coins collected through sales in cash registers by each kind of denomination and counting each of the sorted coins;
    a bill counter for counting bills collected through sales in the cash registers for each kind of denomination;
    an arithmetic unit for aggregating count data as sales data obtained by said coin sorter/counter and said bill counter and storing the aggregated data into a buffer area thereof; and
    an operation unit at least having ten keys for inputting a code number of a sales department to which a cash register whose sales amount is to be processed belongs, and an accept key, to be operated upon completion of processing of sales amounts with respect to the code number imputted by the ten keys, for initiating further processing of sales amounts, a cash processing method comprising the steps of:

designating one unit of said plurality of cash processing units as a master station and the rest of the units as slave stations;

connecting the arithmetic unit of each slave station to the arithmetic unit of the said master station by means of communication lines;

transmitting the sales data stored in said buffer area together with said code number to said master station by way of said communication lines in response to the operation of the accept keys provided in said slave station keys; and aggregating, by the arithmetic unit of said master station, sales data transmitted from each of said slave stations and sales data obtained in the cash processing unit of said master station with respect to each of said code numbers.

2. In a cash processing system comprised of a plurality of cash processing units, wherein the cash processing units are coupled together via data transmission lines and one unit may be designated a master unit and all others slave units, with each cash processing unit having:

a coin sorter/counter means for accepting coins collected from cash registers following sales transactions, for sorting said coins into like denominations, and for counting the sorted coins;

a bill counter means for accepting monetary bills of like denomination collected from cash registers through sales transactions, and for counting such bills for each denomination;

an arithmetic unit for accepting count data from the coin sorter/counter means and bill counter means and aggregating such data with other sales data into processed sales data and having a buffer memory area and data memory area for storage of such data; and an operation unit having a keyboard for data entry, including keys for inputting the code number of a sales department to which the coin and bill count data corresponds and an accept key for prompting the transfer of processed sales data from the buffer memory area of a slave unit to the data memory area of the master unit, a cash processing method comprising the steps of:

designating one cash processing unit of the said plurality of cash processing units as a master station and designating the remaining units as slave units;

coupling the arithmetic unit of each slave unit to the arithmetic unit of the master station for the transfer of data by means of said data transmission lines;

transferring the processed sales data stored in the buffer memory area of the arithmetic unit of a slave cash processing unit, together with the corresponding code numbers, to the master station data memory area by way of the data transmission lines in response to operation of the accept key of a slave unit; and aggregating, by the arithmetic unit of the master station, the sales data transferred from each of the slave units along with the sales data from the cash processing unit of the master station, for each of the sales department code numbers corresponding to sales data.

3. A cash processing system comprising:

a plurality of cash processing units, one of each said cash processing units being designated as a master station and the rest of said cash processing units being designated as slave stations, each processing unit having:

a coin sorter/counter for sorting coins collected through sales in cash registers by each kind of denomination and counting each of the sorted coins;

a bill counter for counting bills collected through sales in the cash registers for each kind of denomination;

an arithmetic unit for aggregating count data as sales data obtained by said coin sorter/counter and said bill counter and storing the aggregated count data into a buffer area thereof, the arithmetic unit of each slave station being connected to the arithmetic unit of the said master station by means of communication lines;

an operation unit having keys for inputting an associated code number of a sales department to which a cash register whose aggregated count data belongs, and an accept key for initiating further processing of count data, to be operated upon completion of storing of said aggregated count data and inputting of said associated code number; and a cash processing means for operating said plurality of cash processing units, including means for:

transmitting the data stored in said buffer area together with said associated code number to said master station by way of said communication lines in response to the operation of said accept key provided in said slave station; and aggregating, by the arithmetic unit of said master station, aggregated count data transmitted from each of said slave units and aggregated count data obtained in the cash processing unit of said master station with respect to each of said code numbers, thereby independently obtaining an aggregated count of coins and bills from each sales department.

* * * * *